United States Patent [19]
Miura et al.

[11] Patent Number: 5,152,189
[45] Date of Patent: Oct. 6, 1992

[54] HIGH-TORQUE DAMPER

[75] Inventors: Osamu Miura, Saitama; Susumu Takano, Chiba; Takeaki Kobori, Tokyo, all of Japan

[73] Assignee: Tok Bearing Co., Ltd., Tokyo, Japan

[21] Appl. No.: 788,612

[22] Filed: Nov. 6, 1991

[30] Foreign Application Priority Data

Mar. 8, 1991 [JP] Japan ............... 3-068787

[51] Int. Cl.[5] ............................. F16F 15/22
[52] U.S. Cl. ..................... 74/573 F; 464/24
[58] Field of Search ........... 74/573 F, 574; 464/24, 464/25

[56] References Cited

U.S. PATENT DOCUMENTS

| | | | |
|---|---|---|---|
| 740,473 | 10/1903 | Scherer | 464/24 X |
| 755,066 | 3/1904 | Smith | 464/24 X |
| 1,422,929 | 7/1922 | Cooke | 464/24 |
| 1,630,737 | 5/1927 | Flanders | 464/24 |
| 2,307,187 | 1/1943 | Anderson | 464/24 |
| 2,381,325 | 8/1945 | Wahl | 74/574 |
| 3,210,962 | 10/1965 | Birdwell | 464/24 X |
| 3,322,212 | 5/1967 | Pauley | 464/24 |
| 3,653,228 | 4/1972 | Tiberio | 464/24 |
| 4,175,408 | 11/1979 | Kasai et al. | 464/25 |

FOREIGN PATENT DOCUMENTS 59-26051 7/1984 Japan.

Primary Examiner—Dirk Wright
Attorney, Agent, or Firm—Jacobson, Price, Holman & Stern

[57] ABSTRACT

Object: An object of the present invention is to provide a damper absorbing a rotary power around its axis, which has a construction to make the damper compact for mounting at a narrow position, which can be applied to cause a highly damped torque.

Entity: A high-torque damper characterized in that it comprises: a casing (3) having a cylindrical chamber (1) in which viscous fluids (2) can be filled; a rotating member (5) which is combined with the casing (3) to be relatively rotatable and has a shaft member (4) in a center which is rotatable in said chamber (1); a movable valve (7) which can be anchored with slack in the rotary direction to an axial projection (6) provided on the shaft member (4) of the rotating member (5) or on a wall surface in the chamber (1), and of which the other surfaces can be slid on a wall surface of the chamber (1) or a peripheral surface of the shaft member (4) and is simultaneously rotatable; a plurality of viscous fluid channels (8, 9 and 10) having each different sectional area, are formed on a contacting portion between said projection (6) and the movable valve (7) so that resistance can be varied corresponding to a direction of a relative rotation.

4 Claims, 5 Drawing Sheets (a) (b) (c)

(a) (b) (c)

(a)

(b)

HIGH-TORQUE DAMPER

BACKGROUND OF THE INVENTION

The present invention relates to a damper used for high torque damping operations.

DESCRIPTION OF PRIOR ART

To operate a cover or door which can be opened and closed up and down, for example, a shock-absorbing device is provided to prevent sudden opening and closing of the cover or door. The conventional device, as disclosed in Japanese Examined Utility Model Publication No. 59-26051, comprises a construction with a back-up arm having a piston mechanism and absorbs shocks with air that is compressed by impact force. Therefore, it is indispensable to provide a surplus space for mounting an arm. Conventional devices have been conclusively unfavorable for arms that need to be provided in a narrow space.

SUMMARY OF THE INVENTION

An object of the present invention is to provide a high-torque damper which can use high torque to absorb rotary power around its axis.

Another object of the present invention is to provide a high-torque damper with a compact size and a simple construction so that the damper can be mounted in a narrower space.

To solve the above-mentioned problems, a high-torque damper, according to the present invention, comprises: a casing (3) having a hollow cylindrical chamber (1) which is closed at an axial end portion and is opened at another portion, in which viscous fluids (2) can be filled; a rotating member (5) which is combined with the casing (3) to be relatively rotatable and has a shaft member (4) in a center which is arranged in said chamber to be relatively rotatable around a shaft; a movable valve (7) which can be anchored, with slack in the rotary direction, to an axial projection (6) provided on said shaft member (4) or in the chamber (1), and is slid on a peripheral surface of the shaft member (4) or a wall surface of the chamber (1) and is provided to be rotatable with the rotating member (5) or the casing (3); a plurality of viscous fluid channels (8, 9 and 10) which are respectively formed in said movable valve (7) and on the projection (6) so that the viscous fluids (2) can be passed with different resistances from one side of the movable valve (7) to another side corresponding to a direction of a relative rotation of the casing (3) and the rotating member (5); and a sealing means (11) which is provided for sealing the viscous fluids (2) between the casing (3) and the rotating member (5).

Said casing (3) and the rotating member (5) rotate relatively and thereby the movable valve (7) also can rotate in the viscous fluids (2) and change its position. The movable valve (7) can be anchored to the projection (6) with slack in the rotary direction. The viscous fluid channels (8, 9, 10), each having a different cross-sectional area, are formed on the projection (6) and in the movable valve (7) and are applied to change their resistance corresponding to a rotary direction.

Thus, there is hardly any resistance with a rotation in one direction, and larger resistance can be created only with a rotation in the opposite direction. In the latter case, the resistance can be varied corresponding to the size of the viscous fluid channel because the movable valve (7) is contacted with the projection (6) with no space between them. Consequently, if only the size of the fluid channel is made small, an extremely high torque can be produced.

BRIEF DESCRIPTION OF THE DRAWINGS

The accompanying drawings show embodiments of a high-torque damper according to the present invention.

DETAILED DESCRIPTION OF PREFERRED EMBODIMENTS

Figure 6:
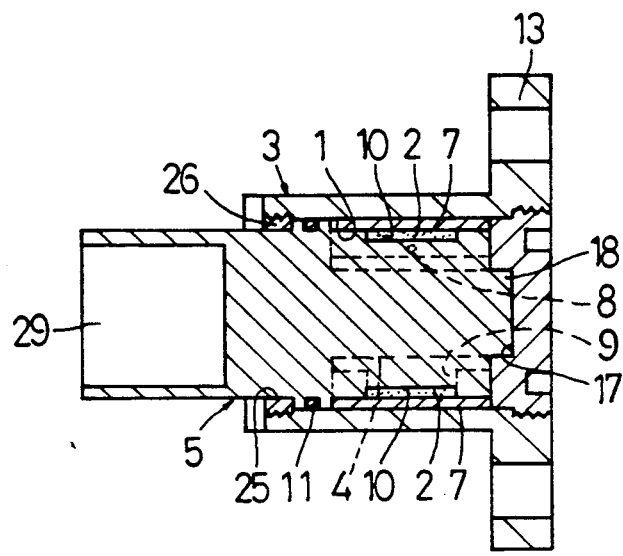
FIG. 6 is a vertical sectional view according to the second embodiment.
Figure 7:
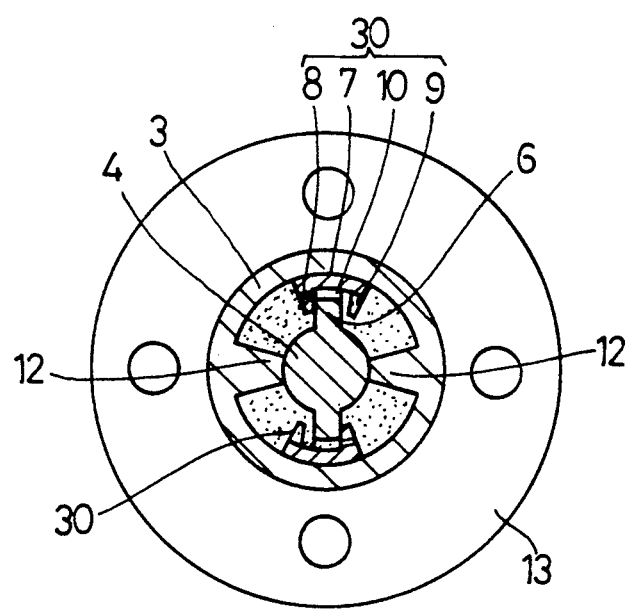
FIG. 7 is a cross-sectional view according to the same embodiment.
Figure 8:
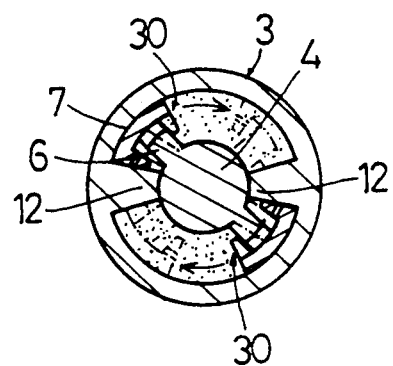
FIG. 8(a), (b) are explanatory sectional views showing an operation according to the same embodiment and shows (a) when the damper is rotated in one direction and (b) when the damper is rotated in the opposite direction.
Figure 8:
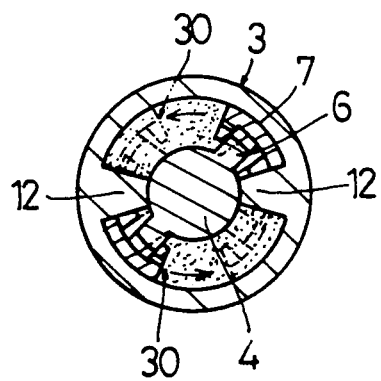

The present invention will be described with reference to the drawings in the following. FIG. 1 to 5 relate to the first embodiment and FIGS. 6 to 8 relate to the second embodiment.

In the first embodiment, the casing (3) comprises the hollow cylindrical chamber (1) and is provided with a lateral flange (13) at one end thereof and is fixed by screwing a closing cover (14) with an internal peripheral surface of chamber 91) for closing the end portion thereof. Reference numeral (15) shows a female screw member to secure the closing cover (14) by screwing, reference numeral (16) shows a male screw member which is provided on an outside surface of the closing cover (14), and reference numeral 17 shows a bearing portion which is formed in the center of the closing cover.

The rotating member (5) is combined with the casing (3) to be rotatable. If the rotating member (5) is provided at the side to be fixed with the flange (13), the rotating member becomes a member equivalent to an input shaft. A top end (18) of the shaft member (4) provided in the center is axially accepted by said bearing portion (17), and a enlarged portion (19) in another end of the shaft member (4), is slid on the internal wall surface (20) of the chamber (1). The viscous fluids (2), which are also known as torque grease, are filled between the internal wall surface (20) of the chamber (1) and the shaft member (4), and, at the outside surface of the enlarged portion (19), a sealing means (11) such as an O ring is fitted in a peripheral groove of its sliding portion.

The projection (6) which is axially and radially projecting is provided on the shaft member (4). At a suitable position thereof, one of fluid channels is provided to determine the amount of viscous fluids passing by the position and the relation and the rotary direction, as mentioned later, between the movable valve (7) and the projection (6). In the embodiment, the movable valve (7) is arranged to get astride the projection (6), and a fluid channel (10) which is formed by cutting away on the projection (6).

Figure 1:
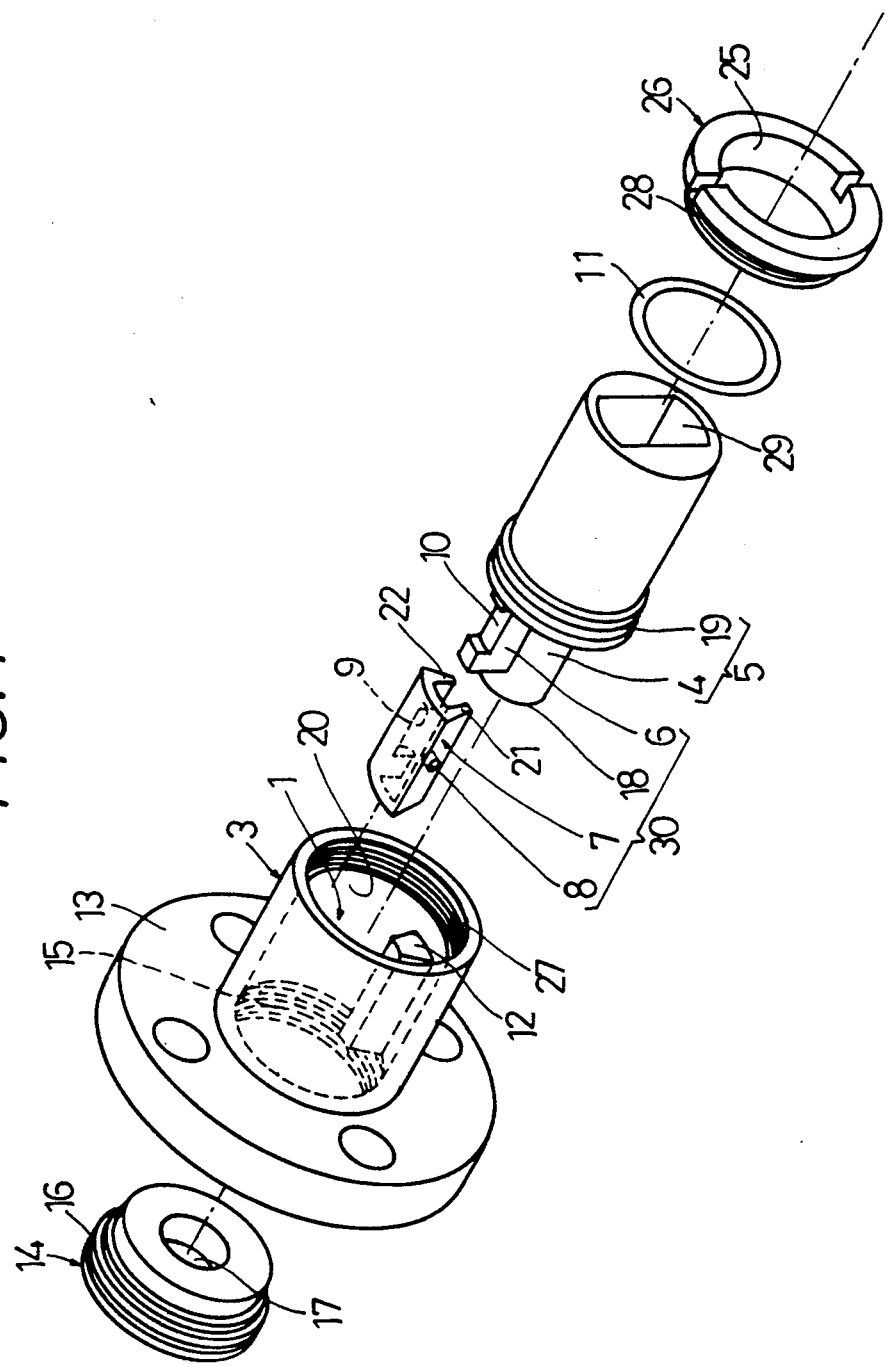
FIG. 1 is an exploded perspective view of a high-torque damper according to the first embodiment.
Figure 2:
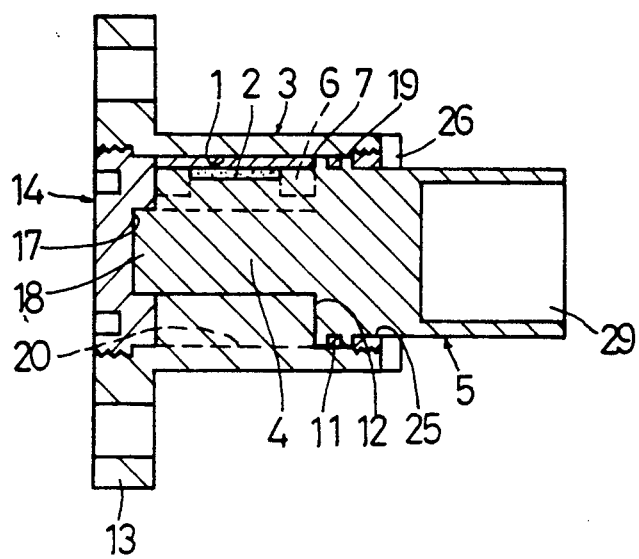
FIG. 2 is a vertical sectional view according to the same embodiment.
Figure 3:
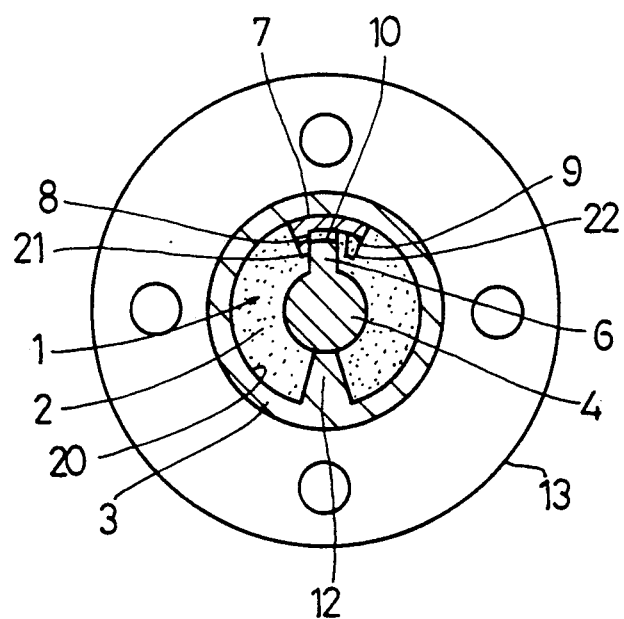
FIG. 3 is a cross-sectional view according to the same embodiment.

The other fluid channels (8 and 9) are formed in both vertical walls (21 and 22), respectively, which are parts of said movable valve (7), and the projection (6) is placed between them. The fluid channel (8), which is provided in the rotary direction to supply torque, is formed in a small cross-sectional area, and the fluid channel (9) which is provided in the opposite direction is formed in a sectional area larger than the fluid channel (8). In the embodiment, as shown in FIG. 3, when the rotating member (5) is turned to the left, a large resistance can be created because the only viscous fluids (2) in an amount limited by the small channel (8) may pass through.

The movable valve (7), as described above, is formed in substantially a u-shape in its sectional view. An interval of the vertical walls (21 and 22), which are provided in each rotary direction, is larger than that in the rotary direction of the projection (6) and has slack in the rotary direction. The movable valve (7) is placed on the projection (6) and is slid on the internal wall surface (20) of the chamber (1) with the outside surface thereof. One end of the projection (6) is positioned to face the internal end surface of the closing cover (14), and another end of the projection (6) is positioned to face the internal end surface of the enlarged portion (19). The projection (6) is rotated in the chamber (1) with a slight interval.

Reference numeral (25) shows an opening for the bearing to axially accept the other end of the rotating member (5), and reference numeral (26) indicates a bearing member which has the form of a ring and in which an opening is provided. The opening for the bearing is fixed by screwing the opening of the other end of the casing (3) so that the rotating member (5) is prevented from coming out. Reference numeral (27) shows the female screw of the internal peripheral surface of the casing, reference numeral (28) shows the male screw of the outside peripheral surface of the bearing member, and reference numeral (29) indicates an engagement hole of the other end of the rotating member (5).

Figure 4:
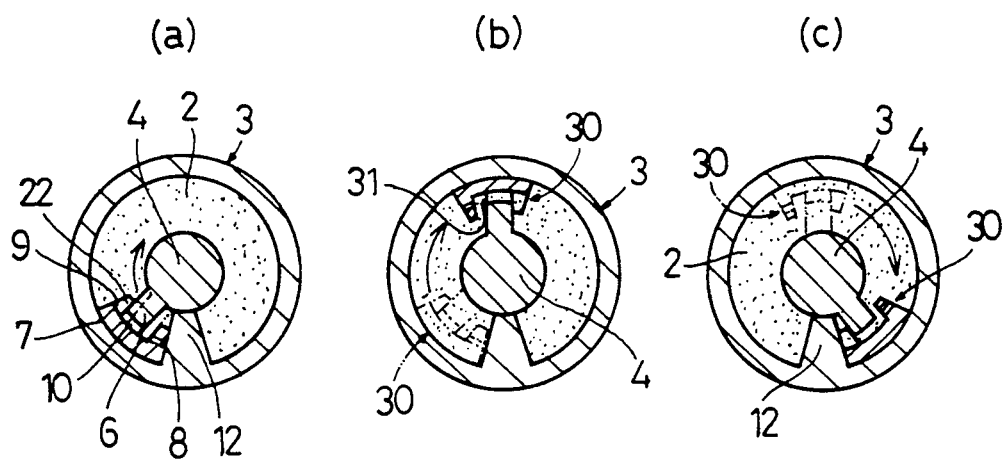
FIG. 4(a), (b), (c) are explanatory sectional views showing operations when the damper is rotated in one direction.
Figure 5:
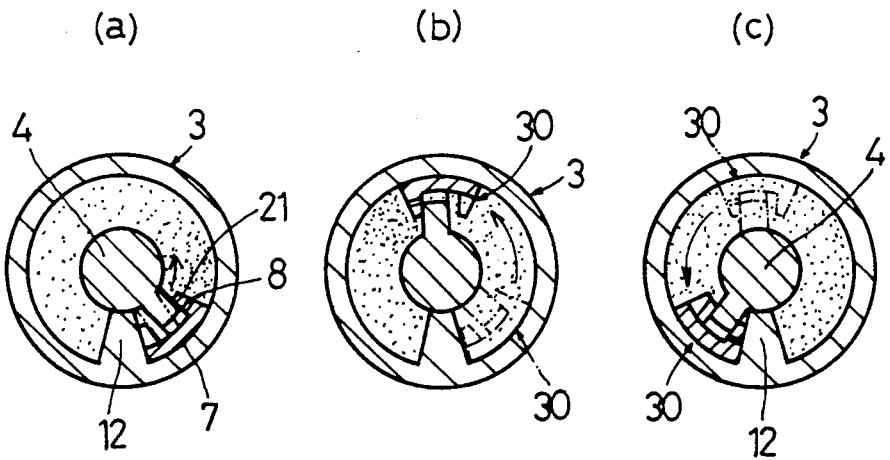
FIG. 5(a), (b), (c) are explanatory sectional views showing operations when the damper is rotated in the opposite direction.

In a high torque creating mechanism (30) constructed as above, an axial stopper (12) is provided on the internal wall surface (20) of the chamber (1) to prescribe the range of rotation of the rotating member (5). The stopper (12) is contacted with the side of the movable valve (7) on the rotating member (5) and can serve as the initial and terminal points of rotation. When the rotating member (5) starts to turn to the right, as shown in FIG. 4 (a), the projection (6) is turned in the same direction in company with the rotating member while contacting the vertical wall (22) which is provided on the other side of the movable valve (7). At this moment, there is a little resistance because the viscous fluids (2) flow in a slack space (31) between the projection (6) and the large area which comprises the channels (9, 10) and the vertical wall (21) (in FIG. 4(b) and 4(c)). In contrast, when the rotating member (5) is turned to the left from the situation shown in FIG. 5(a), the projection (6) of the rotating member (5) is contacted with the vertical wall (21), causing viscous fluids (2) to flow through the small channel (8). In this manner, extremely high torque can be produced (in FIG. 5(b) and (c)).

In the second embodiment, two high-torque creating mechanisms (30) which comprises said projection (6) and the movable valve (7) are provided around the shaft member (4), and two stoppers (12) are provided on the lateral wall surface (20) of the casing (3). The high-torque creating mechanisms (30) and the stoppers (12) are respectively provided at regular intervals in the rotary direction. Therefore, torque becomes twice as high as that in the first embodiment and only half of the rotary angle is necessary. The other construction and operation may be similar to the first embodiment, so only reference numerals will be quoted and detailed descriptions will be omitted.

In the above-mentioned two embodiments, the projection (6) is provided at the side of the rotating member (5). In contrast, the projection (6) may be provided, for example, just as the stopper (12) is provided, on the internal wall surface (20) of the casing (3), and the movable valve (7) may get astride the projection (6), of which the inside surface can be slid on the shaft member (4) of the rotating member (5). In this case, the same operation can be obtained as in the above-mentioned embodiments. Further the stopper (12) can be provided on the shaft member (4), and the projection (6) and the movable valve (7) can be provided under the same condition as in the first and second embodiments. Also, the side of the casing (3) can be naturally constructed as the rotatable side, and the side of the rotating member (5) can be constructed as the fixed side.

The present invention is constructed and operated as described above. Therefore, the present invention is advantageous in that it can be directly mounted on a rotary portion such as an opening and closing mechanism, and it can be formed in a very small space, thus requiring few space limitations for mounting. Moreover, damping with high torque can be easily obtained. Compared with the conventional high-torque apparatuses, the present invention can easily cause medium torque and low torque, and so it is an extremely elastic apparatus. Thus, the present invention is adaptable to a position (such as a shaft member of a toilet cover) which must be formed in a narrow and small space and can be widely applied to covers, doors, heavy cushions with arms, and so forth.

I claim:

1. A high-torque damper characterized in that it comprises: a casing (3) having a hollow cylindrical chamber (1) which is closed at an axial end portion and is opened at another portion, in which viscous fluids (2) can be filled; a rotating member (5) which is combined with the casing (3) to be relatively rotatable and which has a shaft member (4) in its center which is arranged in said chamber to be relatively rotatable around a shaft; a movable valve (7) which can be anchored, with slack in the rotary direction, to an axial projection (6) provided on said shaft member (4) or in the chamber (1), and is slid on a peripheral surface of the shaft member (4) or a wall surface of the chamber (1) and is rotatable with the rotating member (5) or the casing (3); a plurality of viscous fluid channels (8, 9 and 10) which are formed in said movable valve (7) and on the projection (6) so that the viscous fluids (2) can be passed with different resistances from one side of the movable valve (7) to another side corresponding to a direction of relative rotation of the casing (3) and the rotating member (5); and a sealing means (11) which is provided for sealing the viscous fluids (2) between the casing (3) and the rotating member (5).

2. A high-torque damper according to claim 1, wherein there are provided in a rotary direction two or more projections (6) and movable valves (7) anchoring thereon.

3. A high-torque damper according to claim 1, wherein there is provided a stopper (12) or two or more stoppers (12) for stopping the movable valve (7) on the wall surface of the chamber (1) or the peripheral surface of the shaft member (4).

4. A high-torque damper according to claim 1, wherein the projection (6) and the movable valve (7) are provided in parallel with an axis of the cylindrical chamber (1) and their axial lengths are set substantially the same as that of the chamber (1).

* * * * *